(12) United States Patent
Odakura et al.

(10) Patent No.: US 10,596,657 B2
(45) Date of Patent: Mar. 24, 2020

(54) FRICTION STIR WELDING APPARATUS, FRICTION STIR WELDING CONTROL DEVICE, AND FRICTION STIR WELDING METHOD

(71) Applicant: Hitachi Power Solutions Co., Ltd., Hitachi-shi, Ibaraki (JP)

(72) Inventors: Tomio Odakura, Ibaraki (JP); Akihiro Satou, Ibaraki (JP); Satoshi Hirano, Tokyo (JP); Ittou Sugimoto, Tokyo (JP)

(73) Assignee: Hitachi Power Solutions Co., Ltd., Hitachi-shi (JP)

( * ) Notice: Subject to any disclaimer, the term of this patent is extended or adjusted under 35 U.S.C. 154(b) by 0 days.

(21) Appl. No.: 15/939,970

(22) Filed: Mar. 29, 2018

(65) Prior Publication Data
US 2018/0281104 A1 Oct. 4, 2018

(30) Foreign Application Priority Data
Mar. 30, 2017 (JP) .................................. 2017-066641

(51) Int. Cl.
*B23K 20/00* (2006.01)
*B23K 20/12* (2006.01)
*C21D 9/50* (2006.01)
*B23K 101/18* (2006.01)
*C21D 1/42* (2006.01)

(52) U.S. Cl.
CPC ........ *B23K 20/1235* (2013.01); *B23K 20/124* (2013.01); *B23K 20/1245* (2013.01); *C21D 9/505* (2013.01); *B23K 2101/18* (2018.08); *C21D 1/42* (2013.01); *Y02P 10/253* (2015.11)

(58) Field of Classification Search
CPC . B23K 20/127; B23K 20/122; B23K 20/1235
See application file for complete search history.

(56) References Cited

U.S. PATENT DOCUMENTS

| | | |
|---|---|---|
| 2006/0065698 A1 | 3/2006 | Ishikawa et al. |
| 2009/0242613 A1 | 10/2009 | Kawaura et al. |
| 2014/0027496 A1 | 1/2014 | Castillo et al. |
| 2016/0214203 A1 | 7/2016 | Taniguchi et al. |
| 2018/0043466 A1 | 2/2018 | Matsushita et al. |

(Continued)

FOREIGN PATENT DOCUMENTS

| | | |
|---|---|---|
| EP | 3 053 695 A1 | 8/2016 |
| JP | 2003-94175 A | 4/2003 |
| JP | 5883978 B1 | 3/2016 |

(Continued)

OTHER PUBLICATIONS

Extended European Search Report issued in counterpart European Application No. 18165079.7 dated Oct. 5, 2018 (nine (9) pages).

(Continued)

*Primary Examiner* — Erin B Saad
(74) *Attorney, Agent, or Firm* — Crowell & Moring LLP

(57) ABSTRACT

A friction stir welding apparatus includes a FSW tool that is held by a housing and welds to-be-welded members to each other by friction stir, and a gradual cooling device that gradually cools a weld site of the to-be-welded members welded by the FSW tool. The gradual cooling device is a contactless heat source that heats the weld site without coming into contact with the weld site. The contactless heat source is a high-frequency heat source.

12 Claims, 15 Drawing Sheets

(56) References Cited

U.S. PATENT DOCUMENTS

2018/0221986 A1    8/2018   Odakura et al.

FOREIGN PATENT DOCUMENTS

| KR | 10-2009-0105829 A | 10/2009 |
|----|-------------------|---------|
| WO | WO 2015/045421 A1 | 4/2015  |
| WO | WO 2016/147668 A1 | 9/2016  |
| WO | WO 2017/022537 A1 | 2/2017  |

OTHER PUBLICATIONS

Korean-language Office Action issued in counterpart Korean Application No. 10-2018-0035167 dated Mar. 14, 2019 with English translation (12 pages).

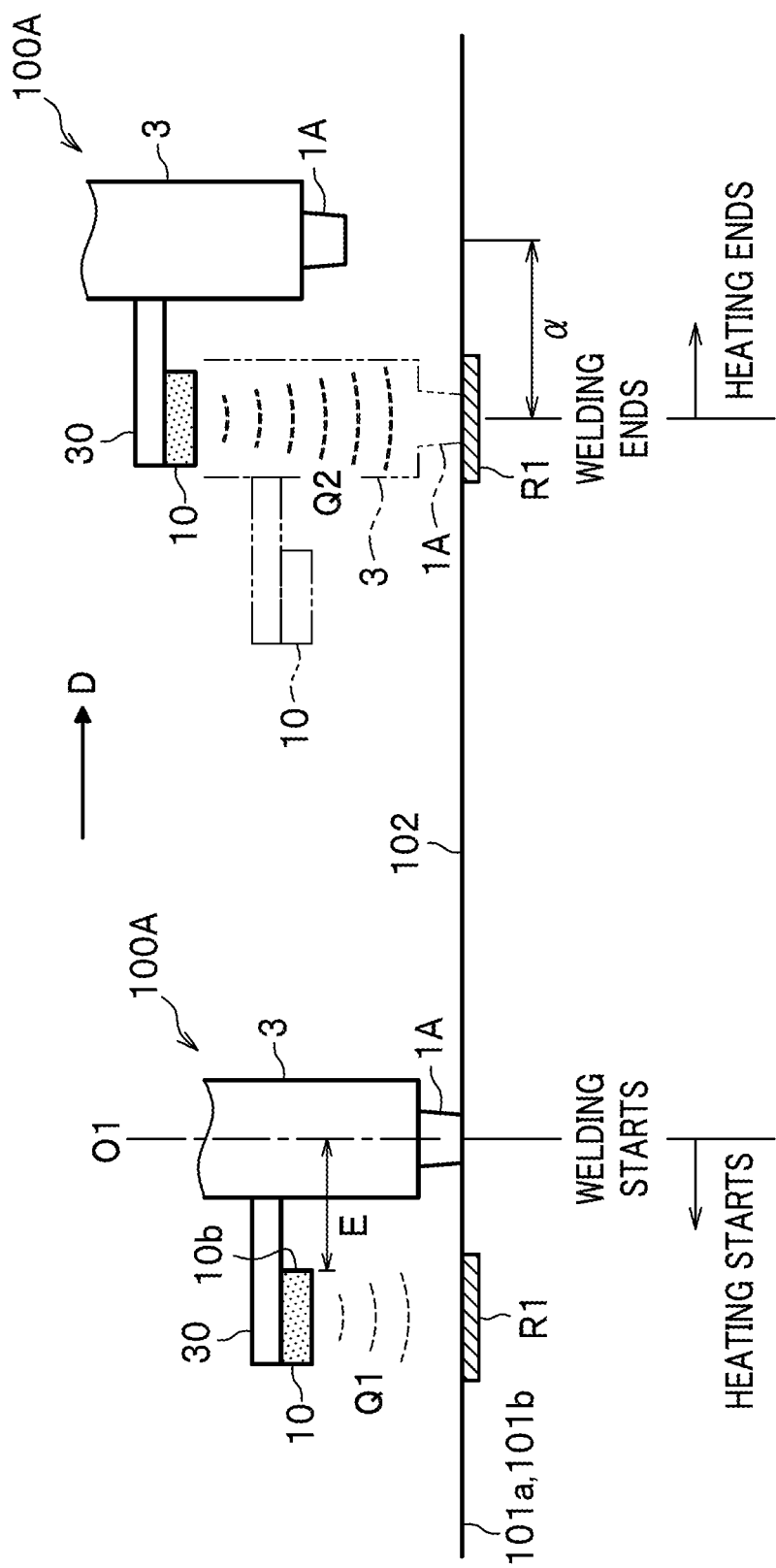

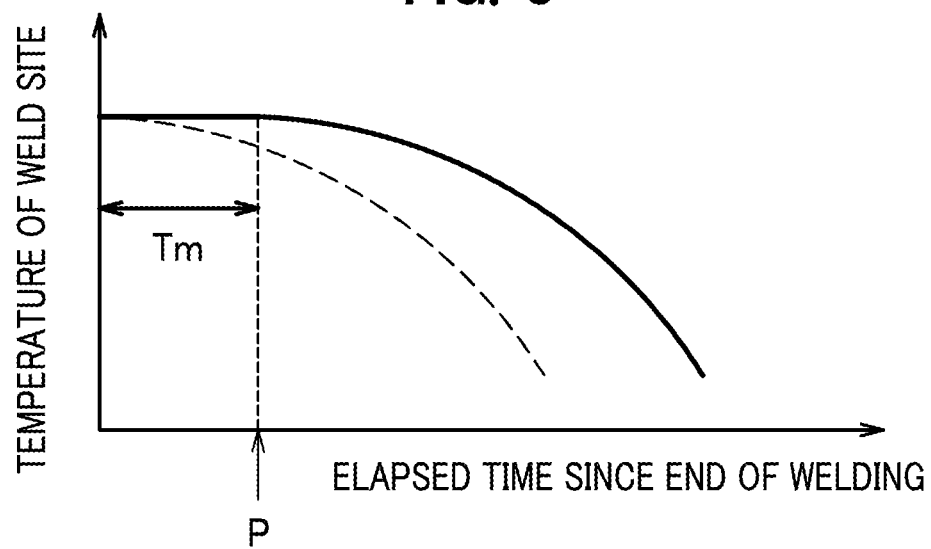

FRICTION STIR WELDING APPARATUS, FRICTION STIR WELDING CONTROL DEVICE, AND FRICTION STIR WELDING METHOD

BACKGROUND OF THE INVENTION

1. Field of the Invention

The present invention relates to a friction stir welding apparatus, a friction stir welding control device, and a friction stir welding method.

2. Description of the Related Art

To perform friction stir welding on to-be-welded members using a friction stir welding (FSW) apparatus, typically, welding conditions (the rotation speed and welding speed of a welding tool) optimal for the to-be-welded members are set to the FSW apparatus before the FSW apparatus starts performing welding. A conventional FSW apparatus retains the welding conditions thus set from the start to the end of the welding and controls the welding using these welding conditions.

For example, there has been proposed a technique of controlling the rotation speed and/or welding speed of a stir tool (FSW tool) by acquiring a welding temperature using a plurality of temperature measuring instruments disposed on the stir tool (welding tool) and controlling the acquired temperature within a predetermined range (see Japanese Patent No. 5883978).

While the technique described in the above patent document controls the welding temperature for friction stir welding with high accuracy, the welding quality has been found to be inadequate.

SUMMARY OF THE INVENTION

The present invention aims to provide a friction stir welding apparatus, a friction stir welding control device, and a friction stir welding method which can achieve high-quality friction stir welding.

A friction stir welding apparatus of the present invention comprises: a friction stir welding tool that is held by an apparatus main body and welds a plurality of to-be-welded members to each other by friction stir; and a gradual cooling device that gradually cools a weld site of the to-be-welded members welded by the friction stir welding tool, and the apparatus main body includes a gradual cooling device welding direction movement driver that moves the gradual cooling device in a welding direction.

The present invention can provide a friction stir welding apparatus, a friction stir welding control device, and a friction stir welding method which can achieve high-quality friction stir welding.

BRIEF DESCRIPTION OF THE DRAWINGS

FIG. 5 is a diagram illustrating the operation of the FSW apparatus according to the first embodiment.

FIG. 6 is a graph showing the relation between the temperature of a weld site and the elapsed time since the end of welding, in the FSW apparatus according to the first embodiment.

DETAILED DESCRIPTION OF THE EMBODIMENTS

Figure 1:
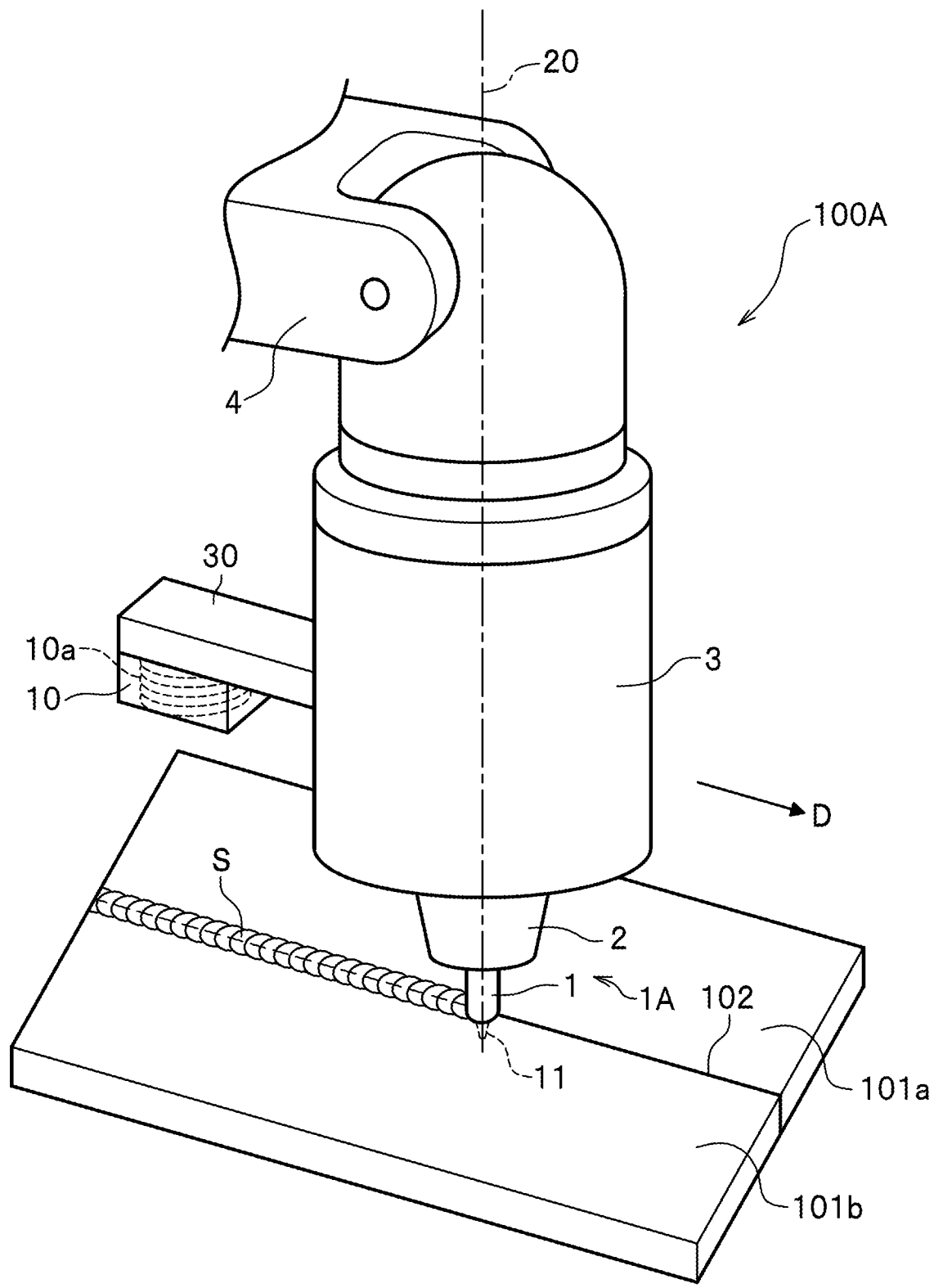
FIG. 1 is a diagram schematically illustrating an example of a perspective view of the external appearance of an FSW apparatus according to a first embodiment.

Embodiments of the present invention are described in detail below with reference to the drawings. Note that common components are denoted by the same reference numerals throughout the drawings to omit repeated description.

First Embodiment

FIG. 1 is a diagram schematically illustrating an example of a perspective view of the external appearance of an FSW apparatus 100A according to a first embodiment.

As FIG. 1 shows, the FSW apparatus 100A includes components such as a friction stir welding (FSW) tool 1A and a gradual cooling device 10.

The FSW tool 1A includes a welding tool 1 having a protrusion (also called a probe) 11, and a tool holder 2 that holds the welding tool 1. The FSW tool 1A is held by a housing 3 (an apparatus main body) that holds the tool holder 2 while allowing the tool holder 2 to rotate.

The housing 3 is a cylindrical container and has a main axis motor 6 (see FIG. 3) and the like housed therein. The main axis motor 6 rotates the solid cylindrical tool holder 2 about its main axis 20. The main axis 20 is the center axis of the solid cylindrical tool holder 2.

The housing 3 thus holding the welding tool 1 and the tool holder 2 is attached to a tip portion of an arm 4 of a machining tool or a multiaxis robot (not shown). In other words, the welding tool 1 is configured to be movable freely in both vertical directions and planar directions by driving of the arm 4 of the machining tool or multiaxis robot.

The protrusion 11 of the welding tool 1 is shaped like an elongated pin extending along the center of the main axis 20 to be described later (see FIG. 2), and is often called a welding tool pin portion. To weld two to-be-welded members 101a and 101b (a plurality of to-be-welded members) to each other, the welding tool 1 held by the tool holder 2 (see FIG. 2) rotates and presses its protrusion 11 onto a welding line 102, which is the border between the to-be-welded members 101a and 101b. In this event, the protrusion 11 is pressed in until the part of the bottom surface of the main body of the welding tool 1 excluding the protrusion 11 (a tool shoulder portion 12, see FIG. 2) comes into contact with the surfaces of the to-be-welded members 101a and 101b.

Once the protrusion 11 is pressed in, temperatures of to-be-welded members 101a and 101b rise due to the friction heat generated by the rotation of the protrusion 11 and the tool shoulder portion 12 (see FIG. 2) in contact with the to-be-welded members 101a and 101b, causing a plastic flow phenomenon. Then, the materials forming the to-be-welded members 101a and 101b experiencing the plastic flow phenomenon are stirred and mixed by the welding tool 1. Further, the welding tool 1 is controlled so that the protrusion 11 moves along the welding line 102 while being pressed in the to-be-welded members 101a and 101b. As a result, the to-be-welded members 101a and 101b are welded to each other at their border portion.

The gradual cooling device 10 is fixed to the housing 3 (the apparatus main body) via a fixation member 30. The fixation member 30 is formed of a plate-shaped member extending from the housing 3 in a direction opposite from the welding direction D. The gradual cooling device 10 is attached to the fixation member 30 on its surface facing the to-be-welded members 101a and 101b.

The gradual cooling device 10 performs post-heating (or post-heat application) on a weld site S (a welded site) of the to-be-welded members 101a and 101b welded by the FSW tool 1A to prevent the weld site S from experiencing a rapid temperature drop or from being quenched. Note that post-heating means heating the weld site S at temperatures that cause almost no alternation of the metallographic structure of the weld site S of the to-be-welded members 101a and 101b welded by the FSW tool 1A. Further, the heating is carried out at temperatures that do not alter the metallographic structure of the weld site welded by the FSW tool 1A.

The gradual cooling device 10 is formed of a high-frequency heat source (a contactless heat source), which is a spirally-wound induction coil 10a. In the gradual cooling device 10, when high-frequency currents are supplied to the induction coil from a high-frequency current generating device (not shown), lines of magnetic force are generated to transverse the weld site S, causing eddy currents inside the weld site S. When the eddy currents are converted to Joule heat, the weld site S produces heat and heats up.

Figure 2:
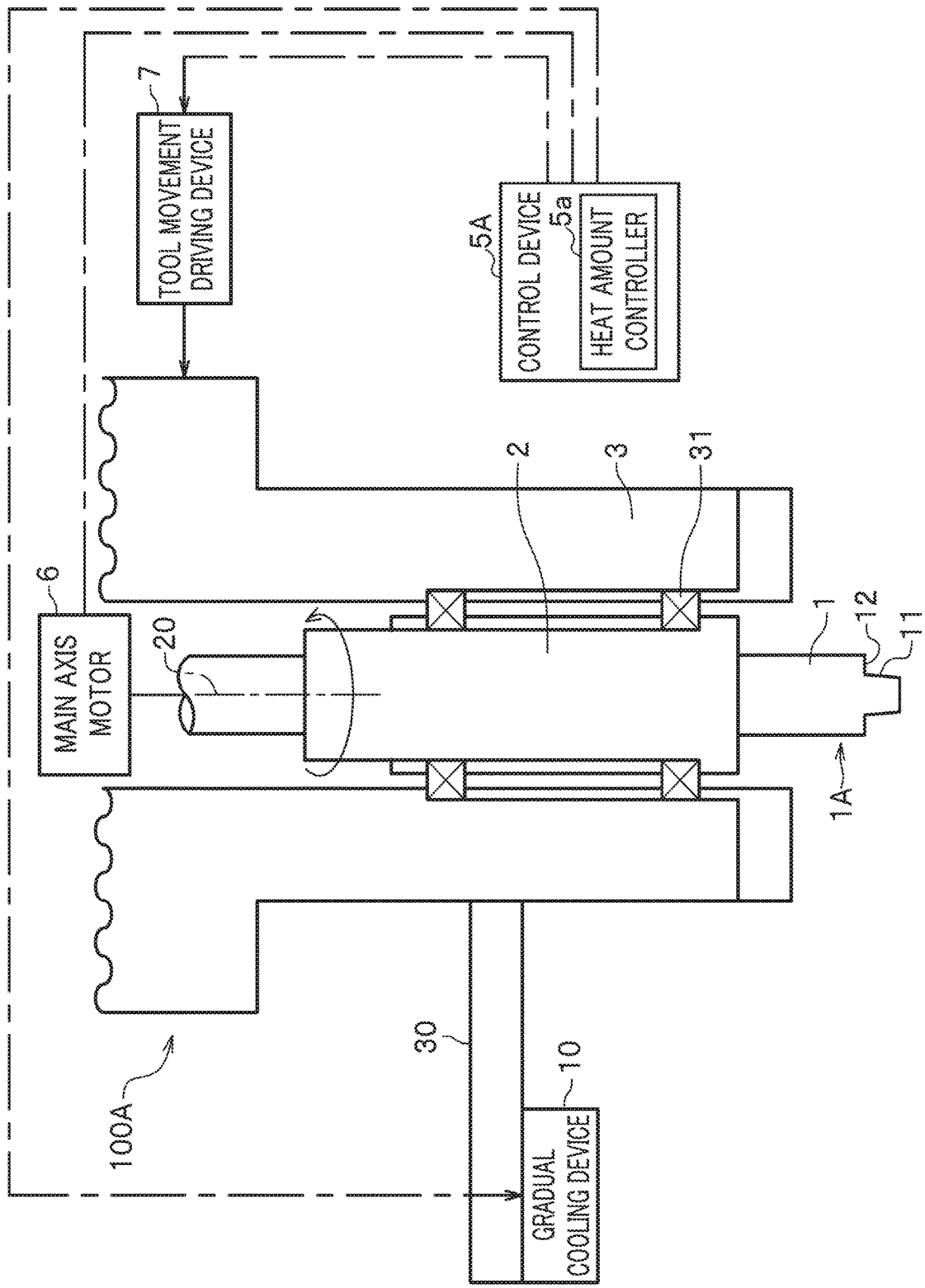
FIG. 2 is a diagram showing a schematic block configuration of the FSW apparatus according to the first embodiment.

FIG. 2 is a diagram illustrating an example of a schematic block configuration of the FSW apparatus 100A according to this embodiment of the present invention. Note that FIG. 2 shows not only the schematic longitudinal sectional structures of the welding tool 1, the tool holder 2, and the housing 3, but also devices and members associated with them.

The housing 3 is a cylindrical container inside which the solid cylindrical tool holder 2 is held while being rotatable about the center axis (the main axis 20) of the solid cylinder via bearings 31. This rotation of the tool holder 2 is driven by the main axis motor 6 attached to the housing 3. The welding tool 1 is attached to a lower end portion of the tool holder 2 and is driven and rotated by the main axis motor 6 along with the tool holder 2.

The welding tool 1 is shaped like a solid cylinder and is coaxial with the tool holder 2. On its bottom surface portion, the welding tool 1 is provided with the elongated, substantially solid cylindrical (pin-shaped) protrusion 11 which is coaxial with the tool holder 2. The part of the bottom surface portion of the welding tool 1 excluding the protrusion 11 is called the tool shoulder portion 12. Of these, the protrusion 11 is pressed in until the tool shoulder portion 12 comes into contact with the surface of the to-be-welded members 101a and 101b. Thus, the tool shoulder portion 12 functions to stop the protrusion 11 from being pressed in further. Also, in this event, the tool shoulder portion 12 pushes the to-be-welded members 101a and 101b, and rotates and slides on their surface. Friction heat produced by the rotation and sliding of the tool shoulder portion 12 heats up the part of the to-be-welded members 101a and 101b near the tool shoulder portion 12 and the protrusion 11, causing a plastic flow phenomenon.

A control device 5A is configured with a general computer including an arithmetic processing device and a storage device (not shown), and controls the rotation speed of the main axis motor 6, the movement speed of a tool movement driving device 7 (a tool movement driver), and the amount of heat to be outputted from the gradual cooling device 10 to the weld site S. Here, the tool movement driving device 7 corresponds to a machining center type FSW apparatus or a multiaxis robot type FSW apparatus having the arm 4 attached to the housing 3 in FIG. 1.

Also, the control device 5A has a heat amount controller 5a that controls the gradual cooling device 10 so that the weld site S may have a temperature similar to a post-welding temperature.

A storage device of the control device 5A stores the following FSW control data. Specifically, the FSW control data are formed by welding temperature, the rotation speed of the main axis motor, tool movement speed, and the like associated with the materials and plate thicknesses of the to-be-welded members 101a and 101b. For the rotation speed of the main axis motor, an initial value, a stationary value #1, and a stationary value #2 are set, and for the tool movement speed, a stationary value #1 and a stationary value #2 are set.

The initial value for the rotation speed of the main axis motor is an initial value for the speed at which the main axis motor 6 is to rotate when the protrusion 11 of the welding tool 1 is pressed into the to-be-welded members 101a and 101b. Further, the stationary values #1 and #2 of the main axis motor rotation speed are data set as the rotation speed of the main axis motor 6 during welding, and the stationary values #1 and #2 of the tool movement speed are data set as the movement speed of the welding tool 1 during welding. These values, such as the initial value and stationary values #1 and #2 of the main axis motor rotation speed and the stationary values #1 and #2 of the tool movement speed, are appropriate values determined in advance by experiment or simulation according to, for example, the materials and plate thicknesses of the to-be-welded members 101a and 101b.

Figure 3:
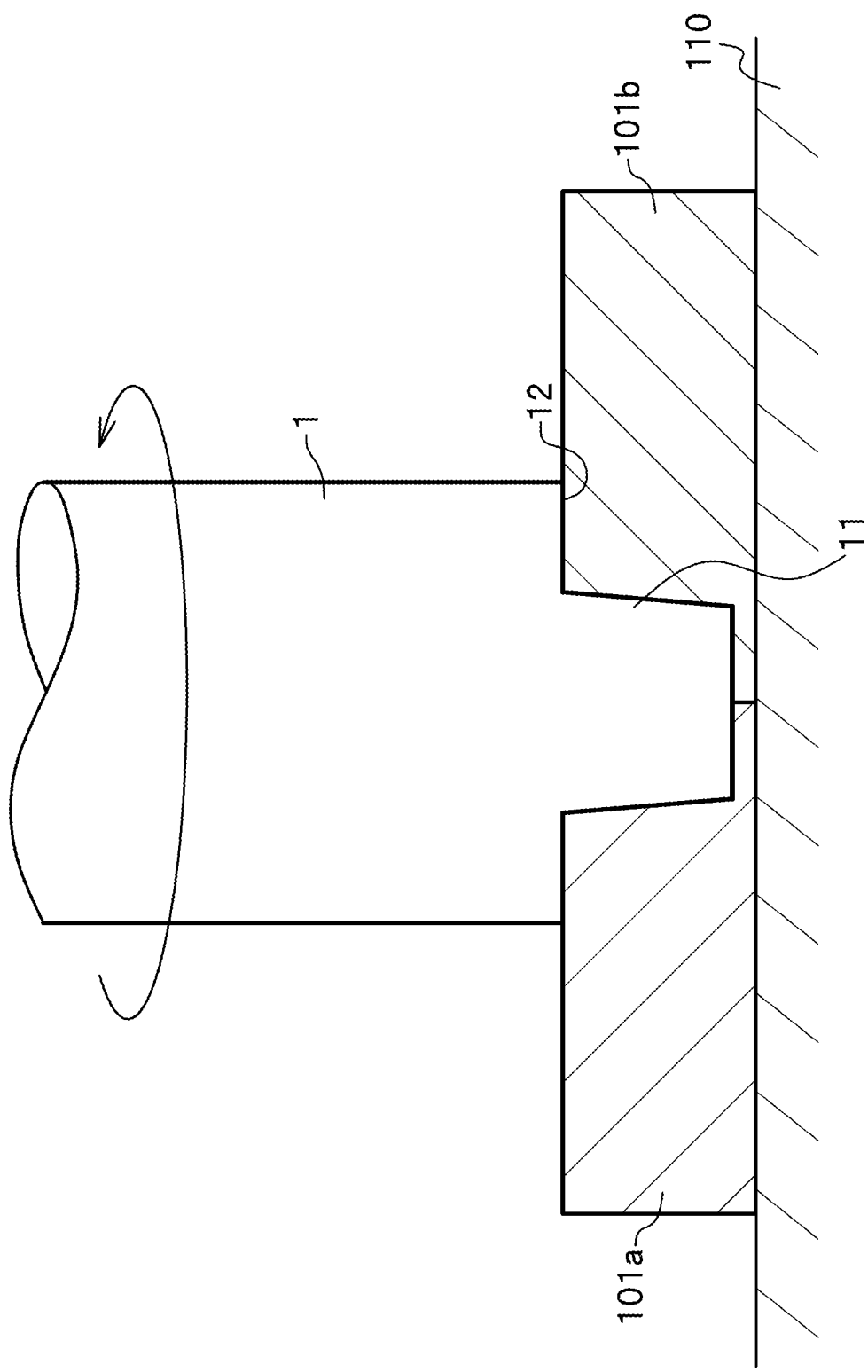
FIG. 3 is a sectional view schematically illustrating how a welding tool is pressed into to-be-welded members.

FIG. 3 is a longitudinal sectional view schematically illustrating how the protrusion of the welding tool is pressed into the to-be-welded members.

To butt-weld two to-be-welded members 101a and 101b of the same kind (e.g., two aluminum alloy plates) as FIG. 3 shows, the to-be-welded members 101a and 101b are placed on a backing member 110, and the protrusion 11 of the welding tool 1 is pressed into their border portion while rotating.

In this event, the protrusion 11 is pressed to a depth where the tip portion thereof almost reaches the back surfaces of the to-be-welded members 101a and 101b while the tool shoulder portion 12 comes into contact with the front surfaces of the to-be-welded members 101a and 101b. Thus, the diameter, length, shape, and the like of the protrusion 11 of the welding tool 1 are determined typically according to the plate thicknesses and materials of the targets to be welded. The backing member 110 has high resistance to heat and has sufficient rigidity to withstand load in the tool axial direction.

Figure 4A:
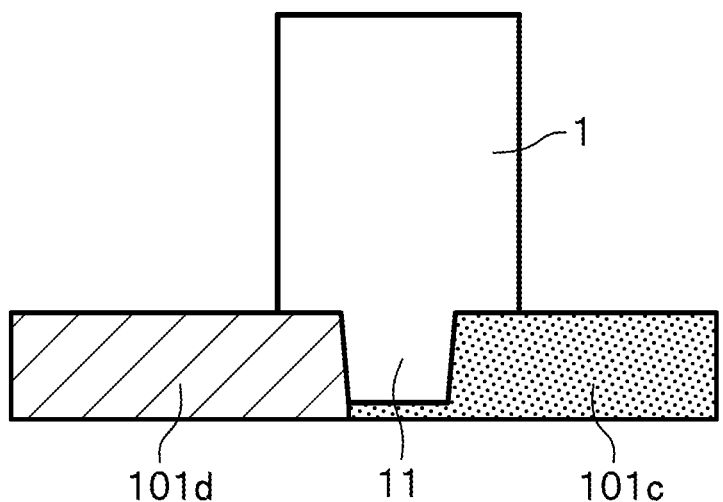
FIGS. 4A and 4B illustrate an example of how to-be-welded members made of different materials are welded to each other, FIG. 4A showing butt welding, FIG. 4B showing lap welding.
Figure 4B:
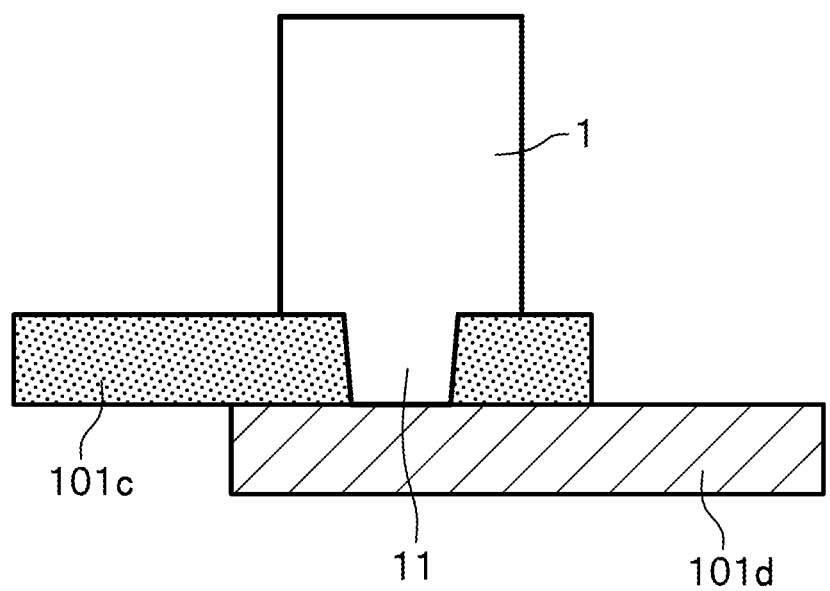

FIGS. 4A and 4B illustrate an example of how to-be-welded members made of different materials are welded to each other, FIG. 4A showing butt welding, FIG. 4B showing lap welding.

As FIG. 4A shows, to butt-weld to-be-welded members 101c and 101d made of different materials, the protrusion 11 of the welding tool 1 is pressed into a position such that the entire protrusion 11 is in the to-be-welded member 101c made of a material that softens at low temperatures, with the outer circumference of the protrusion 11 being in contact with the border of the to-be-welded members 101c and 101d. For example, if the to-be-welded member 101c is made of an aluminum alloy and the to-be-welded member 101d is made of an iron alloy, the protrusion 11 of the welding tool 1 is pressed into a position on the to-be-welded member 101c made of an aluminum alloy.

Note that, to weld the to-be-welded members 101c and 101d made of different materials, a plastic flow phenomenon occurs in the to-be-welded member 101c which softens at low temperatures (e.g., an aluminum alloy), but does not necessarily occur in the to-be-welded member 101d (e.g., an iron alloy). Nonetheless, in such a case, metallic atoms in the to-be-welded member 101c diffuse to the to-be-welded member 101d, causing eutectic crystals to be formed at their border to weld them together.

To lap-weld the to-be-welded members 101c and 101d made of different materials as illustrated in FIG. 4B, the protrusion 11 of the welding tool 1 is pressed first into the to-be-welded member 101c made of a material that softens at low temperature until the tip of the protrusion 11 comes into contact with the to-be-welded member 101d.

Further, the to-be-welded members 101c and 101d in FIG. 4B may be made of the same material. In this case, however, the protrusion 11 of the welding tool 1 is preferably pressed into the lower to-be-welded member 101d as well beyond their border. This allows a friction stir region to be formed at their border portion, producing a rigid weld.

FIG. 5 is a diagram illustrating the operation of the FSW apparatus according to the first embodiment. In FIG. 5, the diagram shown to the left illustrates the FSW apparatus at the start of welding, the diagram drawn in a chain double-dashed line illustrates the FSW apparatus at the end of welding, and the diagram shown to the right illustrates the FSW apparatus at the end of heating. Also note that the FSW apparatus is shown in a simplified form, and the solid line extending in the welding direction D from the right to the left in FIG. 5 is the welding line 102.

As illustrated in the left diagram in FIG. 5, the FSW apparatus 100A includes the gradual cooling device 10 fixed to the housing 3 (the apparatus main body) via the fixation member 30. The gradual cooling device 10 of this embodiment moves vertically as the FSW tool 1A moves vertically.

In the FSW apparatus 100A, the rotation center O1 of the FSW tool 1A (the main axis 20) and the gradual cooling device 10 (an end portion 10b thereof closer to the FSW tool 1A) are away from each other by a distance E. In the present embodiment, the distance E is a physical distance always created between the FSW tool 1A and the gradual cooling device 10.

At the start of welding, which is shown in the left diagram in FIG. 5, heating by the gradual cooling device 10 starts. In this regard, the gradual cooling device 10 is configured to output heat amount Q1 to heat a range R1 indicated with hatching. In other words, every position on the weld site S (see FIG. 1) formed from the start of welding to the end of welding is heated (gradually cooled) in the range R1.

Then, friction stir welding is performed from the welding start position with the FSW tool 1A moving in the welding direction D, and continued until the FSW tool 1A is moved to the welding end position shown in the chain double-dashed line in FIG. 5. At this welding end position, the FSW apparatus 100A is moved vertically upward to move the FSW tool 1A away from the to-be-welded members 101a and 101b. However, being located rearward of the FSW tool 1A in the welding direction D, the gradual cooling device 10 has not reached the welding end position when the FSW tool 1A is at the welding end position. It is therefore necessary to move the FSW apparatus 100A further in the welding direction D so that the gradual cooling device 10 may be moved to the welding end position.

The vertically upward movement of the FSW apparatus 100A at the end of welding changes the distance between the gradual cooling device 10 and the to-be-welded members 101a and 101b (or the weld site S) since the gradual cooling device 10 moves vertically as the FSW tool 1A moves vertically. The heat amount Q1 which has been applied to the weld site S from the start of welding to the end of welding is now insufficient. Thus, heat amount Q2 which is larger than the heat amount Q1 is used to heat the weld site S for a distance α from the end of welding to the end of heating (the end of gradual cooling). Note that the heat amount Q2 is one that achieves the same heat capacity as that applied to the weld site S by the heat amount Q1. In other words, the heat amount Q2 is one that causes the weld site S to be heated at the same temperature as when heated by the heat amount Q1.

Then, the control device 5A controls the gradual cooling device 10 to change the heat amount Q1 to the heat amount Q2 from the end of welding to the end of heating, and the heating is continued until the position of the gradual cooling device 10 reaches the welding end position (distance α).

When the to-be-welded members 101a and 101b welded by the FSW apparatus 100A is thus heated by the gradual cooling device 10 at the weld site S after welding, the time when the weld site S starts cooling down can be delayed.

FIG. 6 shows the relation between the temperature of a weld site and the elapsed time since the end of welding in the FSW apparatus according to the first embodiment. Note that in FIG. 6, the solid line indicates the present embodiment, and the broken line indicates a comparative example. Note that in the comparative example in FIG. 6, the gradual cooling device 10 of the present embodiment is not provided, and the weld site is naturally cooled right after welding ends.

When no gradual cooling device 10 is provided, the weld site S starts to naturally cool right after welding and experiences rapid cooldown, as shown with the broken line in FIG. 6. In the comparative example, for example, if high-tensile strength steel plates are welded to each other as the to-be-welded members 101a and 101b, a crack or the like occurs after the welding.

By contrast, in the first embodiment, which includes the gradual cooling device 10 illustrated in FIG. 6, after the welding, the weld site S immediately undergoes gradual cooling (post-heating) by the gradual cooling device 10, and therefore the start of natural cooling can be delayed by the length of time Tm. Over the time Tm which starts upon completion of welding, the weld site S is maintained at a temperature similar to a post-welding temperature. After the time Tm passes, the temperature of the weld site S starts to drop at the start point P due to natural cooling. When the natural cooling start point P is thus delayed by the gradual cooling device 10, a high-quality weld site S having no crack or the like after the welding can be produced even if, for example, high-tensile strength steel plates are welded as the to-be-welded members 101a and 101b.

Incidentally, regular welding cannot be employed for high-tensile strength steel plates because regular welding is known to cause them to lose tensile force at the welded portion. With friction stir welding, on the other hand, high-tensile strength steel plates do not lose their tensile force after welding. It has been found, however, that when friction stir welding is employed to weld high-tensile strength steel plates with the temperature controlled appropriately from the start of welding to the end of welding, a crack occurs at the weld site after the welding. Then, it has been found that when the FSW apparatus 100A of the present embodiment including the gradual cooling device 10 is employed to weld high-tensile strength steel plates, a high-quality friction stir weld can be produced with no troubles such as a crack after the welding.

Further, the to-be-welded members 101a and 101b to employ in the present embodiment are not limited to a combination of high-tensile strength steel plates, and may be any other combinations, such as a combination of an aluminum alloy and iron.

As described above, the FSW apparatus 100A of the first embodiment includes the FSW tool 1A that is held by the housing 3 and welds a plurality of to-be-welded members 101a and 101b to each other by friction stir, and the gradual cooling device 10 that gradually cools the weld site S of the to-be-welded members 101a and 101b welded by the FSW tool 1A. This allows the start point P of natural cooling of the weld site S to be delayed (see FIG. 6), and hence allows the weld site S to be of higher quality than when the gradual cooling (post-heating) is not carried out. When the weld site S is thus post-heated by the gradual cooling device 10 to delay the start of natural cooling, high-quality friction stir welding can be achieved.

It is preferable in the first embodiment that the gradual cooling device 10 employs a contactless heat source which heats the weld site S without coming into contact with the weld site S. While use of a contact heat source may degrade welding quality by friction caused between the contact heat source and the weld site S, use of a contactless heat source does not cause friction with the weld site S, and thus helps prevent degradation in the welding quality.

Further, it is preferable in the first embodiment that a high-frequency heat source is used as the contactless heat source. This allows the weld site S to be maintained at a temperature equal to or close to the temperature immediately after the welding (temperature that causes no metallographic alteration) with a contactless, simple configuration. Thus, further improvement in welding quality can be expected.

Note that the contactless heat source may alternatively be an optical heat source such as laser light, or other heat sources. Such an optical heat source can also post-heat the weld site S in a similar manner to a high-frequency heat source.

The FSW apparatus 100A of the first embodiment further includes the tool movement driving device 7 that moves the FSW tool 1A along the welding line 102, and the control device 5A (the heat amount controller 5a) that controls the amount of heat that the gradual cooling device 10 applies to the weld site S (see FIG. 2). The gradual cooling device 10 is fixed to the housing 3, and the control device 5A increases the amount of heat to apply to the weld site S when FSW tool 1A is moved away from the weld site S at the end of welding. Thus, even though the FSW tool 1A and the gradual cooling device 10 are configured to be physically away from each other in the welding direction D, all the regions welded by the FSW tool 1A can be gradually cooled. Moreover, having fewer movable parts allows a simpler configuration of the FSW apparatus 100A and also enhances the reliability as a product.

Second Embodiment

Figure 7:
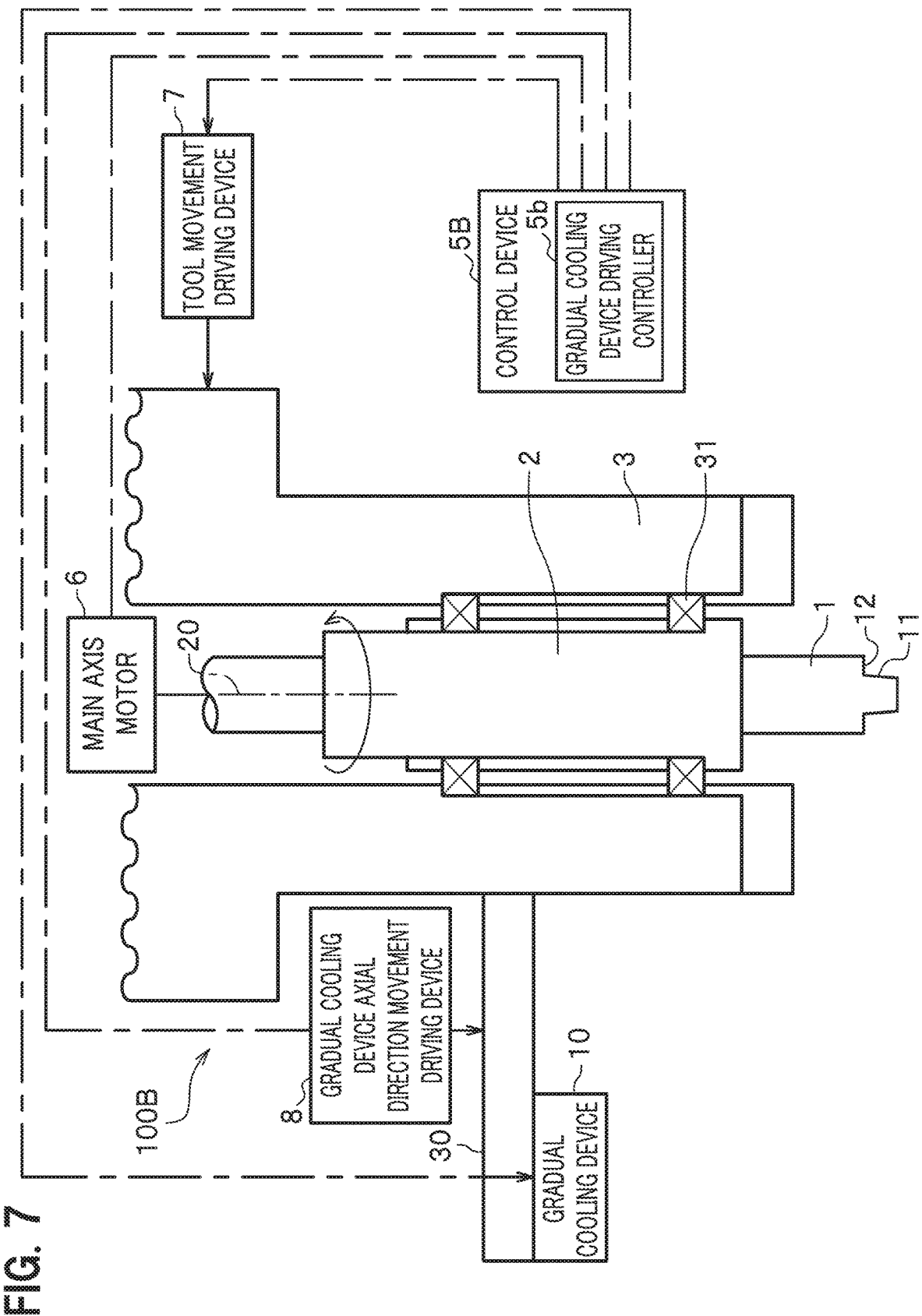
FIG. 7 is a diagram showing a schematic block configuration of an FSW apparatus according to a second embodiment.

FIG. 7 is a diagram showing a schematic block configuration of an FSW apparatus according to a second embodiment. Note that the same components as those in the first embodiment are denoted by the same reference numerals as those used in the first embodiment to omit repeated descriptions (the same applies to the following embodiments as well).

As FIG. 7 shows, an FSW apparatus 100B of the second embodiment includes a gradual cooler axial movement driving device 8 (a gradual cooling device axial movement driver) that enables the gradual cooling device 10 to move vertically (i.e., the axial direction of the FSW tool 1A).

The gradual cooler axial movement driving device 8 is provided between the housing 3 and the fixation member 30 and configured to move the fixation member 30 vertically relative to the housing 3 to vertically move the gradual cooling device 10 fixed to the fixation member 30. In addition, using a known method including a rack and pinion mechanism and an electric motor, the gradual cooler axial movement driving device 8 may be configured to be able to convert the rotational force of the electric motor to linear force for the gradual cooling device 10.

Further, the gradual cooler axial movement driving device 8 is electrically connected to a control device 5B, and when the FSW tool 1A moves away from the weld site S at the end of welding, controls and moves the gradual cooling device 10 toward the weld site S so that the distance between the gradual cooling device 10 and the weld site S may be the same as that before the end of welding.

The control device 5B has a gradual cooler driving controller 5b (a gradual cooling device driving controller) that controls the gradual cooler axial movement driving device 8 that moves the gradual cooling device 10 vertically. This configuration eliminates the control for changing the amount of heat outputted from the gradual cooling device 10 like in the first embodiment.

Figure 8:
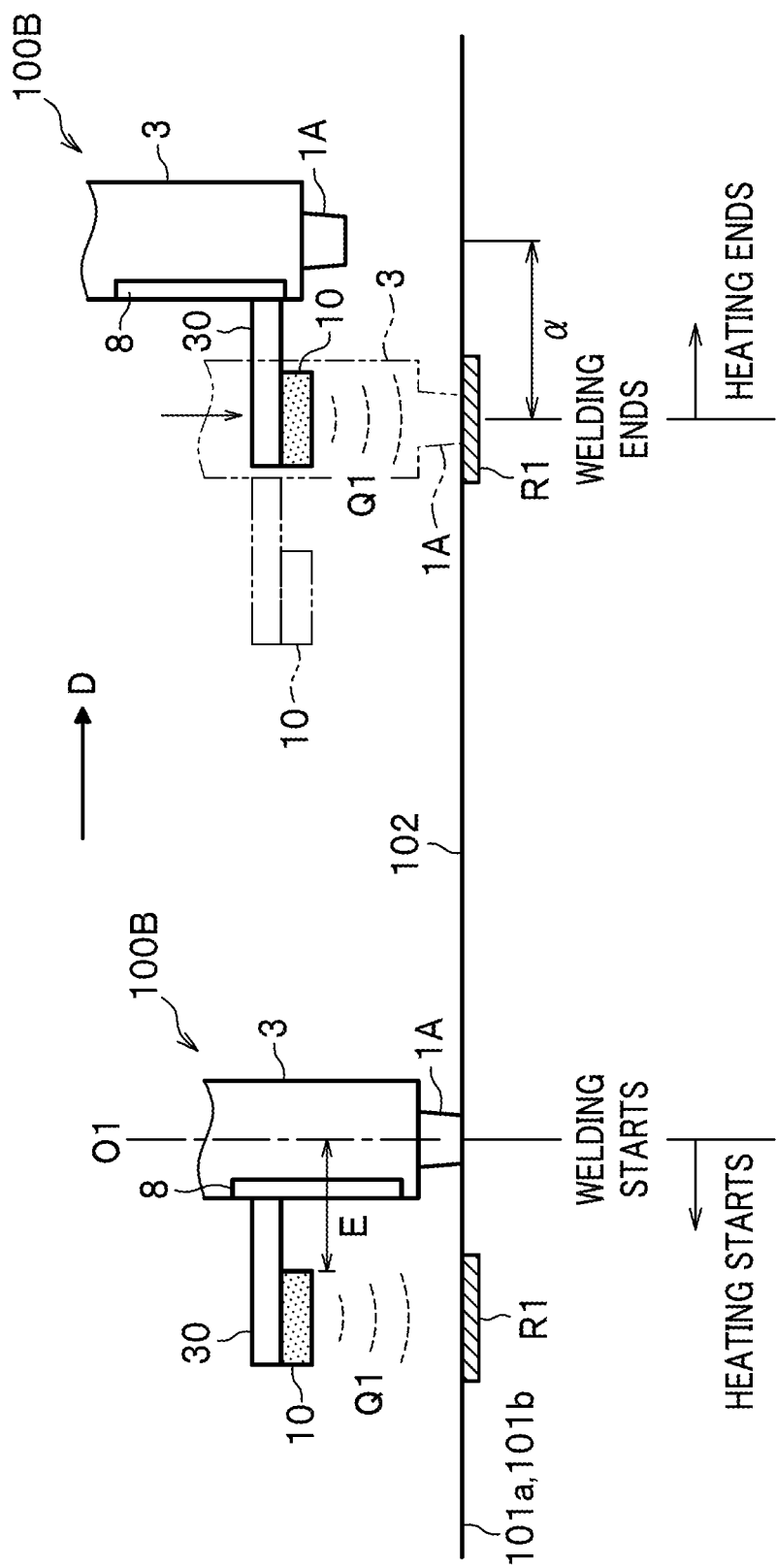
FIG. 8 is a diagram illustrating the operation of the FSW apparatus according to the second embodiment.

FIG. 8 is a diagram illustrating the operation of the FSW apparatus according to the second embodiment. Note that in FIG. 8, the diagram to the left illustrates the FSW apparatus at the start of welding, the diagram drawn in a chain double-dashed line illustrates the FSW apparatus at the end of welding, and the diagram to the right illustrates the FSW apparatus at the end of heating.

As illustrated in the left diagram in FIG. 8, in the FSW apparatus 100B of the second embodiment, the gradual cooling device 10 moves vertically relative to the FSW tool 1A as the fixation member 30 fixed to the housing 3 (the apparatus main body) is moved vertically by the gradual cooler axial movement driving device 8.

At the start of welding in FIG. 8, heating by the gradual cooling device 10 starts. Note that at the start of welding in FIG. 8, the gradual cooling device 10 heats the range R1 indicated with hatching with the heat amount Q1.

Then, friction stir welding is performed from the welding start position in FIG. 8 with the FSW tool 1A moving in the welding direction D, and continued until the FSW tool 1A is moved to the welding end position shown in the chain double-dashed line in FIG. 8. At the welding end position in FIG. 8, the FSW apparatus 100B is moved vertically upward to move the FSW tool 1A away from the to-be-welded members 101a and 101b. However, since the gradual cooling device 10 has not reached the welding end position yet when the FSW tool 1A is at the welding end position in FIG. 8, the FSW apparatus 100B needs to be moved further in the welding direction D.

The upward movement of the FSW apparatus 100B at the end of welding changes the distance between the weld site S and the gradual cooling device 10. Thus, in the FSW apparatus 100B which includes the gradual cooler axial movement driving device 8 that moves the gradual cooling device 10 vertically relative to the housing 3, the gradual cooling device 10 is moved down by the gradual cooler axial movement driving device 8 for the distance α from the end of welding to the end of heating to make the distance between the weld site S and the gradual cooling device 10 the same as before the end of welding. Specifically, if the FSW tool 1A is raised X cm at the end of welding, the gradual cooling device 10 is lowered X cm. This way, the same amount of heat Q1 can be used to heat the weld site S for the distance from the welding start position to the welding end position plus the distance α. The heat amount control for the gradual cooling device 10 is then unnecessary, and the control by the control device 5B can be simplified.

When the to-be-welded members 101a and 101b welded by the FSW apparatus 100B is thus heated by the gradual cooling device 10 at the weld site S after welding, the time when the weld site S starts cooling down can be delayed.

The FSW apparatus 100B of the second embodiment includes the tool movement driving device 7 that moves the FSW tool 1A along the welding line 102, the gradual cooler axial movement driving device 8 that moves the gradual cooling device 10 toward and away from the weld site S, and the gradual cooler driving controller 5b that controls the gradual cooler axial movement driving device 8. When the FSW tool 1A is moved away from the weld site S at the end of welding, the gradual cooler driving controller 5b causes the gradual cooler axial movement driving device 8 to drive the gradual cooling device 10 toward the weld site S. This configuration only involves mechanical positional change of the gradual cooling device 10, and therefore the control by the control device 5B is simpler than the case of changing the amount heat from the gradual cooling device 10. The other configurations that are the same as those of the first embodiment offer the same advantageous effects.

Third Embodiment

Figure 9:
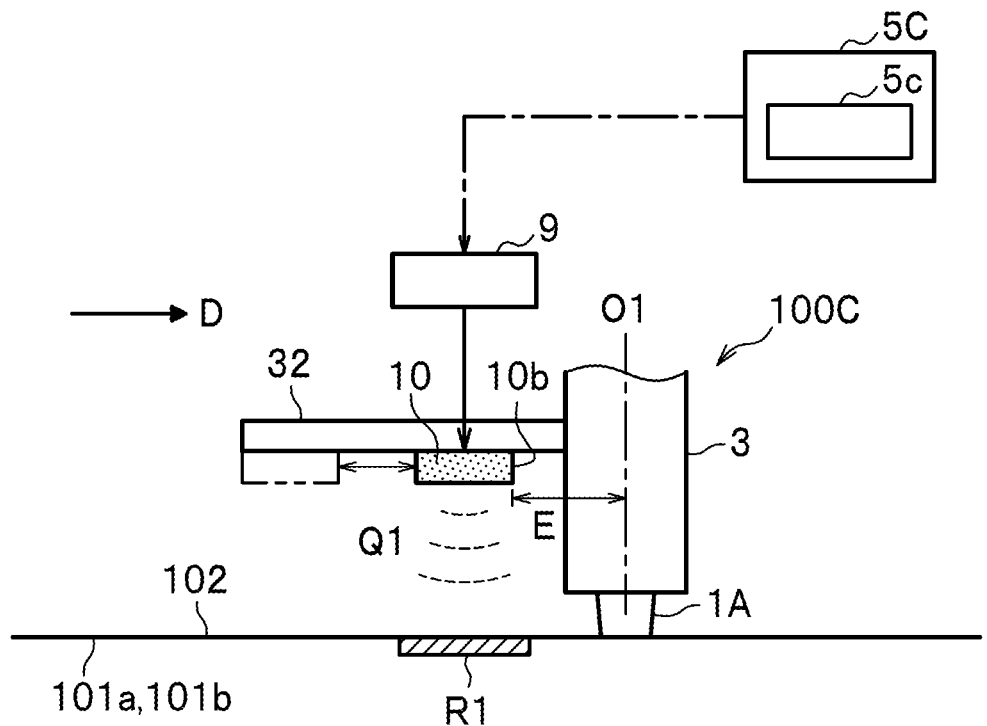
FIG. 9 is a diagram showing a schematic configuration of an FSW apparatus according to a third embodiment.

FIG. 9 is a diagram showing a schematic configuration of an FSW apparatus according to a third embodiment.

As FIG. 9 shows, an FSW apparatus 100C of the third embodiment includes a gradual cooler welding direction movement driving device 9 (a gradual cooling device welding direction movement driver) that moves the gradual cooling device 10 in the welding direction D. The gradual cooler welding direction movement driving device 9 is provided to a fixation member 32, and is capable of changing the distance E between the rotation center O1 of the FSW tool 1A (the main axis 20) and the gradual cooling device 10 (the end portion 10b thereof closer to the FSW tool 1A). Other configurations are the same as those in the first embodiment. Using a known method including a rack and pinion mechanism and an electric motor, the gradual cooler welding direction movement driving device 9 is configured to be able to convert the rotational force of the electric motor to linear force for the gradual cooling device 10.

A control device 5C has a gradual cooler welding direction driving controller 5c that controls the gradual cooler welding direction movement driving device 9 that moves the gradual cooling device 10 in the welding direction D.

In the FSW apparatus 100C of the third embodiment, the housing 3 includes the gradual cooler welding direction movement driving device 9 that moves the gradual cooling device 10 in the welding direction D. This configuration allows the position of the gradual cooling device 10 to be changed in the welding direction D according to the movement speed of the protrusion 11 (probe). Thus, appropriate changes can be made according to various combinations of the to-be-welded members 101a and 101b.

Fourth Embodiment

Figure 10:
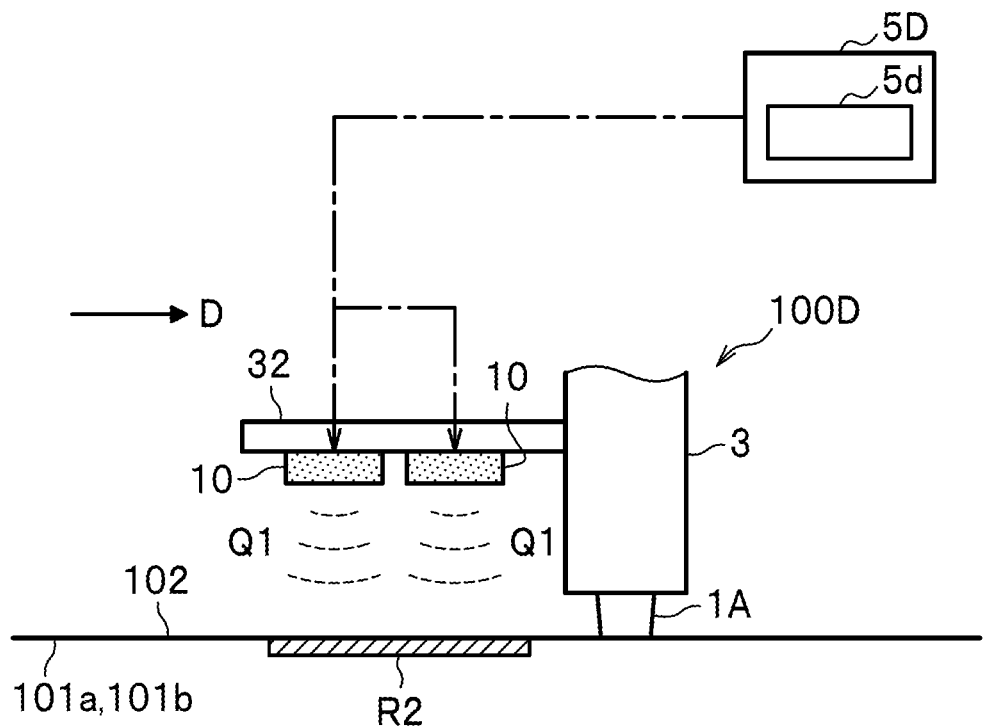
FIG. 10 is a diagram showing a schematic configuration of an FSW apparatus according to a fourth embodiment.

FIG. 10 is a diagram showing a schematic configuration of an FSW apparatus according to a fourth embodiment.

As FIG. 10 shows, an FSW apparatus 100D according to the fourth embodiment is a modification of the third embodiment, and includes a plurality of gradual cooling devices 10, 10 arranged in the welding direction. Note that the number of the gradual cooling devices 10 is not limited to two, and may be three or more.

A control device 5D includes a heat amount controller 5d that controls the gradual cooling devices 10, 10. The heat amount controller 5d controls the gradual cooling devices 10, 10 so that the weld site S may be maintained at a temperature similar to that right before the welding.

In the FSW apparatus 100D thus configured, each of the gradual cooling devices 10, 10 can heat the weld site S with the heat amount Q1. In this case, the weld site S can be heated over a range R2 indicated with hatching. In other words, in the fourth embodiment, the weld site S can undergo post-heating longer than (twice as long as) that in the first embodiment.

Figure 11:
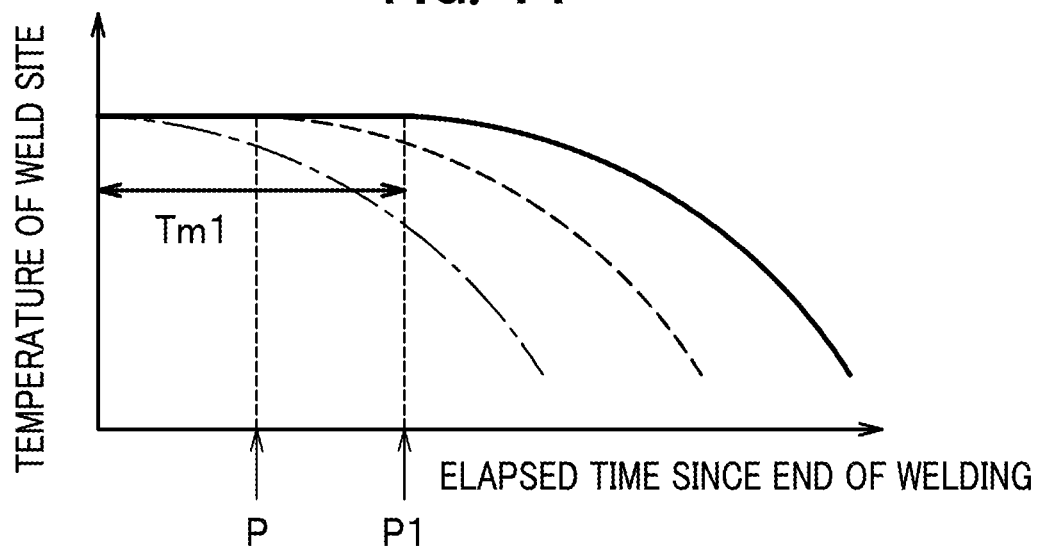
FIG. 11 is a graph showing the relation between the temperature of a weld site and the elapsed time since the end of welding, in the FSW apparatus according to the fourth embodiment.

FIG. 11 is a graph showing the relation between the temperature of a weld site and the elapsed time since the end of welding in the FSW apparatus according to the fourth embodiment. Note that in FIG. 11, the solid line indicates the fourth embodiment, the broken line indicates the first embodiment, and a dot and dash line indicates the comparative example. The broken line and the dot and dash line are the same as the solid line and the broken line in FIG. 6, respectively.

As the solid line in FIG. 11 shows, in the fourth embodiment which includes the plurality of gradual cooling devices 10, 10, the weld site S undergoes gradual cooling (post-heating) by the gradual cooling devices 10, 10 after welding, and thus the start of natural cooling can be delayed even more than the first embodiment (the broken line) (see time Tm1). The temperature of the weld site S starts decreasing at a natural cooling start point P1. Delaying the start point P1 of natural cooling using the plurality of gradual cooling devices 10, 10 allows the weld site S to be of high quality.

The FSW apparatus 100D of the fourth embodiment includes a plurality of gradual cooling devices 10, 10 arranged in the welding direction D. This can extend the length of time for post-heating the weld site S and achieve high-quality friction stir welding.

Note that each of the gradual cooling devices 10, 10 may be additionally provided with a gradual cooler welding direction movement driving device so as to be able to move in the welding direction D as in the third embodiment. In this regard, one or both of the gradual cooling devices 10, 10 may be configured to be movable.

Fifth Embodiment

Figure 12:
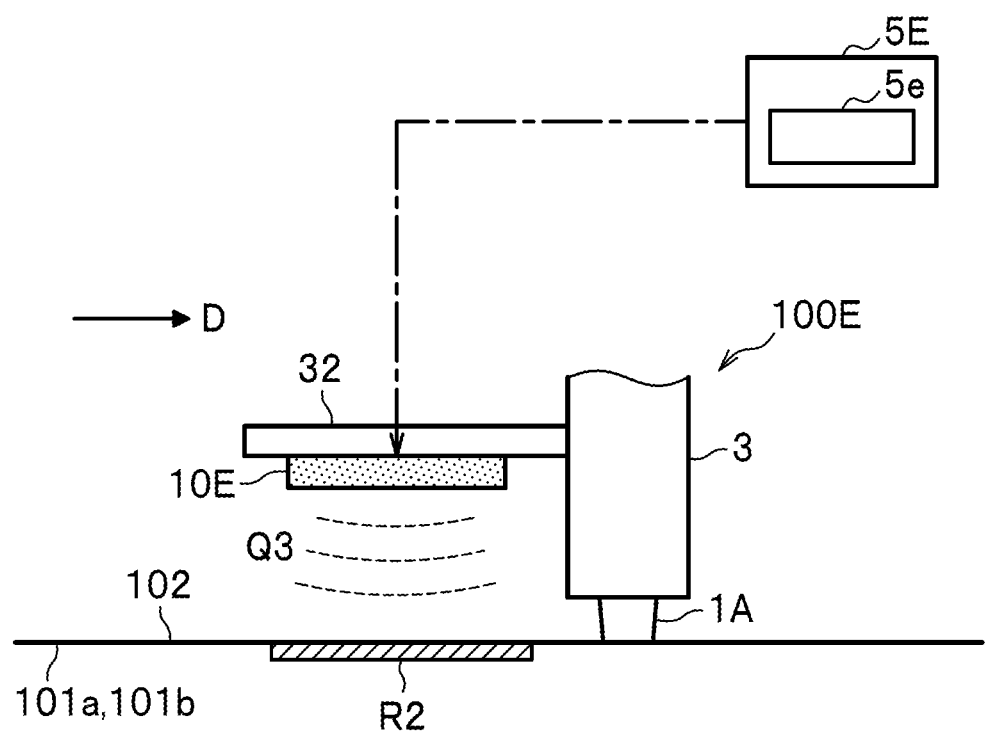
FIG. 12 is a diagram showing a schematic configuration of an FSW apparatus according to a fifth embodiment.

FIG. 12 is a diagram showing a schematic configuration of an FSW apparatus according to a fifth embodiment.

As FIG. 12 shows, an FSW apparatus 100E of the fifth embodiment includes a large gradual cooling device 10E in place of the gradual cooling device 10 of the first embodiment. The gradual cooling device 10E is configured with, for example, a high-frequency heat source, which is an induction coil with larger diameter and more coils than the one in the first embodiment.

A control device 5E includes a heat amount controller 5e that controls the gradual cooling device 10E. The heat amount controller 5e controls the gradual cooling device 10 to heat the weld site S with a heat amount Q3 so that the weld site S may be maintained at a temperature similar to that immediately after welding.

Note that in the fifth embodiment, if the FSW tool 1A and the gradual cooling device 10E are configured to move vertically together like in the first embodiment, the heat amount controller 5e may increase the amount of heat to be applied for the distance α after the end of welding (see FIG. 5). Further, in the fifth embodiment, if the gradual cooling device 10 is movable relative to the FSW tool 1A like in the second embodiment, the gradual cooler axial direction movement driving device may be employed to allow the gradual cooling device 10E to move in the axial direction of the FSW tool 1A for the distance α after the end of welding (see FIG. 8).

Like in the fourth embodiment, the FSW apparatus 100E of the fifth embodiment can extend the time for post-heating the weld site S (see the solid line in FIG. 11) and achieve high-quality friction stir welding.

Sixth Embodiment

Figure 13:
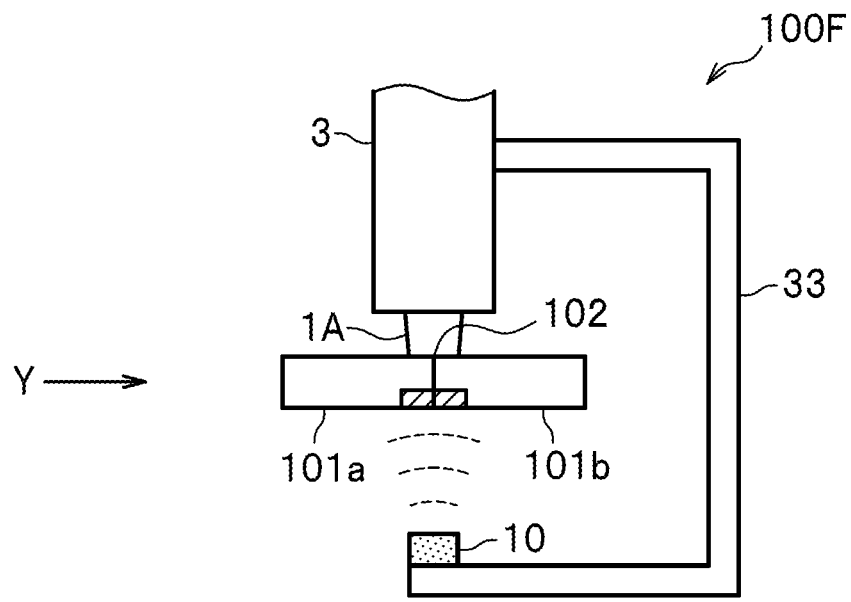
FIG. 13 is a diagram showing a schematic configuration of an FSW apparatus according to a sixth embodiment.
Figure 14:
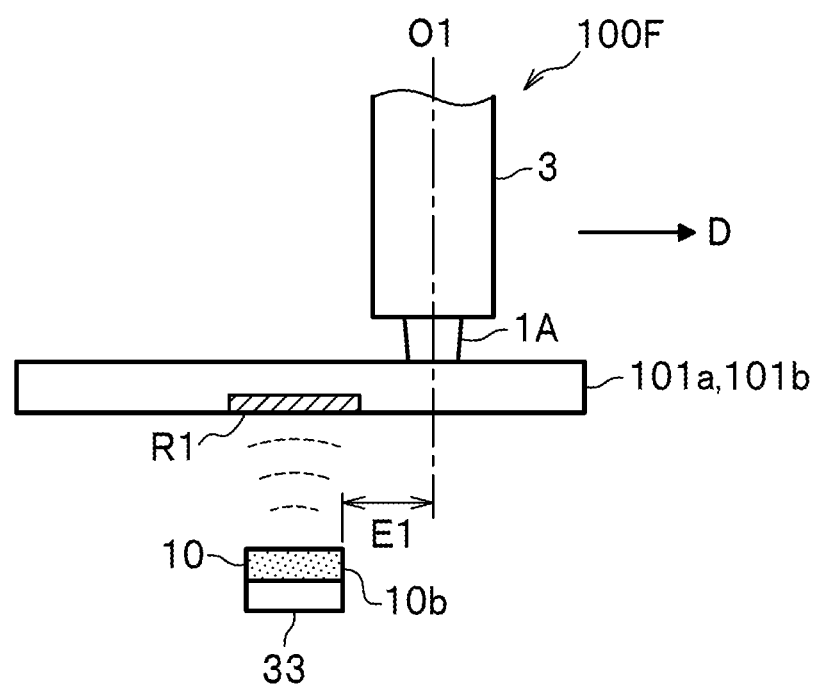
FIG. 14 shows the FSW apparatus of FIG. 13 in the direction of the arrow Y.

FIG. 13 is a diagram showing a schematic configuration of an FSW apparatus according to a sixth embodiment, and FIG. 14 shows the FSW apparatus of FIG. 13 in the direction of the arrow Y.

As FIG. 13 shows, an FSW apparatus 100F of the sixth embodiment is such that the gradual cooling device 10 is provided on the opposite side of the to-be-welded members 101a and 101b from the FSW tool 1A. Further, the FSW apparatus 100F includes a letter C-shaped frame 33 (fixation member) substantially shaped like the letter C when seen in the welding line direction.

The gradual cooling device 10 is disposed at a position away from and vertically below the welding line 102 along which the to-be-welded member 101a and the to-be-welded member 101b are brought into butt-contact. With such a configuration, the gradual cooling device 10 performs the gradual cooling (heating) from the side opposite from where the FSW tool 1A performs welding.

As FIG. 14 shows, in the FSW apparatus 100F, the rotation center O1 of the FSW tool 1A and the gradual cooling device 10 (the end portion 10b thereof closer to the FSW tool 1A) are away from each other by the length of a distance E1.

In the sixth embodiment, the gradual cooling device 10 is provided on the opposite side of the to-be-welded members 101a and 101b from the FSW tool 1A. Thus, the distance E1 can be set to be short, which enables the gradual cooling (post-heating) to start promptly after the welding by the FSW tool 1A, shortening the time lag between the end of welding and the start of the gradual cooling (post-heating).

Seventh Embodiment

Figure 15:
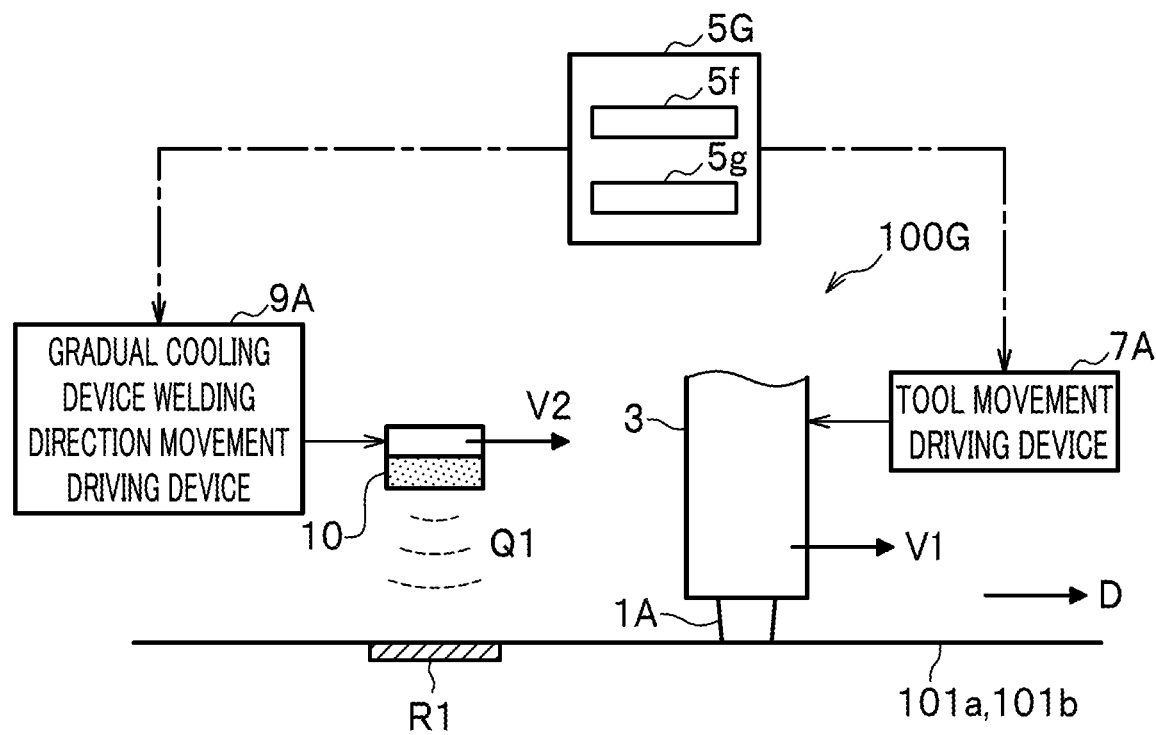
FIG. 15 is a diagram showing a schematic configuration of an FSW apparatus according to a seventh embodiment.

FIG. 15 is a diagram showing a schematic configuration of an FSW apparatus according to a seventh embodiment.

As FIG. 15 illustrates, an FSW apparatus 100G of the seventh embodiment includes a tool movement driving device 7A (a first driver) that moves the FSW tool 1A in the welding direction D. The FSW apparatus 100G also includes a gradual cooler welding direction movement driving device 9A (a second driver) that moves the gradual cooling device 10 in the welding direction D. Thus, the FSW tool 1A and the gradual cooling device 10 are configured to move in the welding direction D independently of each other.

A control device 5G has a tool driving controller 5f that controls the tool movement driving device 7A, and a gradual cooler driving controller 5g that controls the gradual cooler welding direction movement driving device 9A.

The FSW apparatus 100G of the seventh embodiment includes the tool movement driving device 7A that drives the FSW tool 1A in the welding direction D and the gradual cooler welding direction movement driving device 9A that drives the gradual cooling device 10 in the welding direction D. This enables the FSW tool 1A and the gradual cooling device 10 to be driven independently of each other, which makes control of higher accuracy possible. For example, the amount of heat to apply to the weld site S may be increased by making the movement speed V2 of the gradual cooling device 10 slower than the movement speed V1 of the FSW tool 1A. This makes it easier for the weld site S to be maintained at a temperature close to a welding temperature.

Eighth Embodiment

Figure 16:
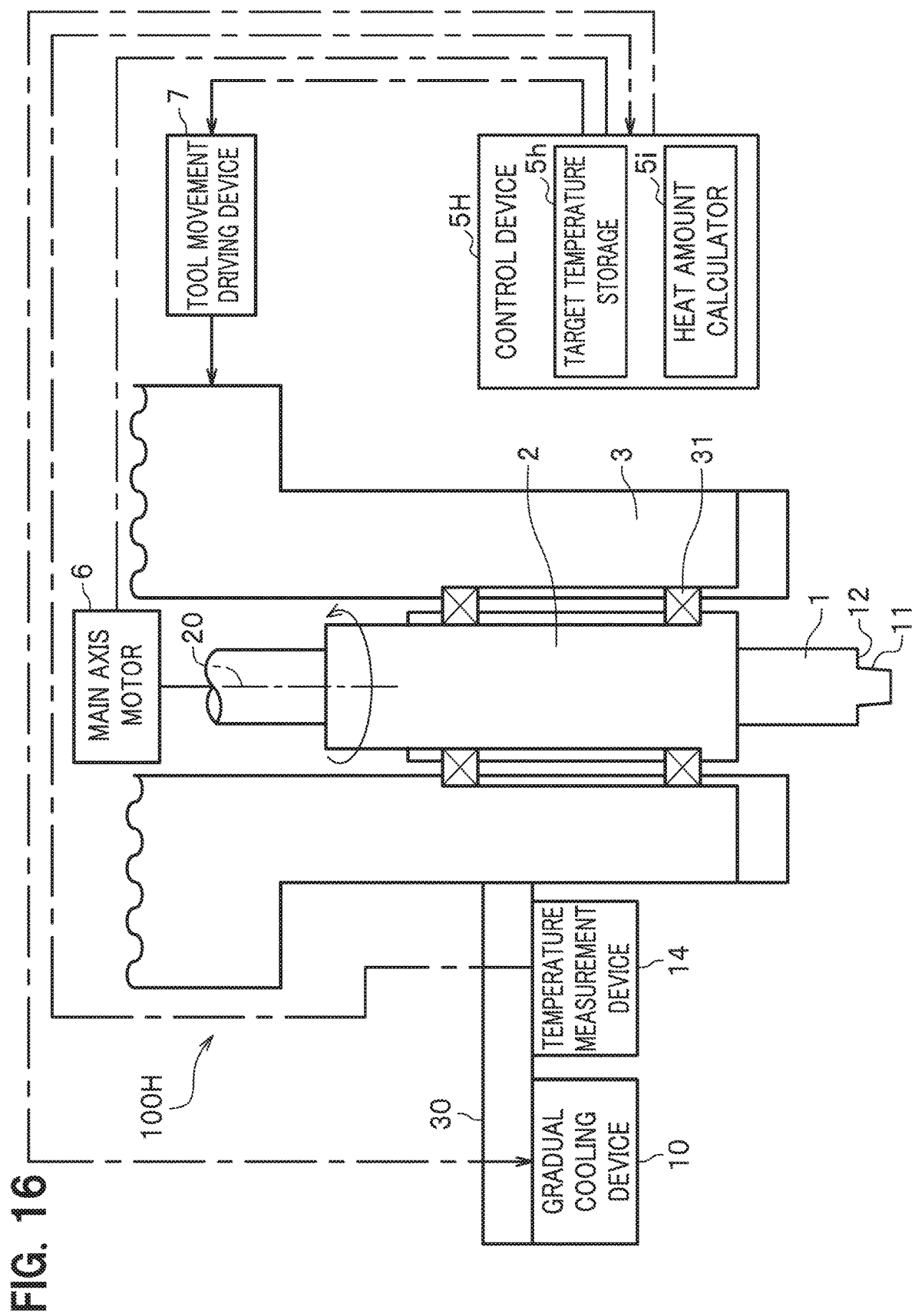
FIG. 16 is a diagram showing a schematic block configuration of an FSW apparatus according to an eighth embodiment.

FIG. 16 is a diagram showing a schematic block configuration of an FSW apparatus according to an eighth embodiment.

As FIG. 16 shows, an FSW apparatus 100H of the eighth embodiment is the FSW apparatus 100A of the first embodiment additionally including a temperature measurement device 14 that measures the temperature of the weld site S (welding temperature). The temperature measurement device 14 measures the temperature of a measurement target in a contactless manner, and may be configured using what is called thermography.

The temperature measurement device 14 is fixed to the fixation member 30 on which the gradual cooling device 10 is fixed. The temperature measurement device 14 is located close to the gradual cooling device 10 and between the gradual cooling device 10 and the FSW tool 1A. With this temperature measurement device 14, the temperature of the weld site S or the temperature in the vicinity of the weld site S (an area about to be heated by the gradual cooling device 10) can be measured.

A control device 5H (a friction stir welding control device) includes a target temperature storage 5h that stores target temperatures to be set for the weld site S (a target temperature at which a site having undergone welding is to be maintained), and a heat amount calculator 5i that calculates the amount of heat to be applied to the weld site S based on the target temperature.

The target temperature storage 5h stores a database of target temperatures which are determined based on associations between the kinds and thicknesses of the to-be-welded members 101a and 101b, the movement speed (travelling speed) of the FSW tool 1A, and the distance between the protrusion 11 and the gradual cooling device 10 (i.e., the distance between the rotation center O1 of the FSW tool 1A and the end portion 10b of the gradual cooling device 10). A target temperature suitable for the friction stir welding of the to-be-welded members 101a and 101b is selected from the target temperature storage 5h. The target temperatures are determined by previous tests or the like.

Figure 17:
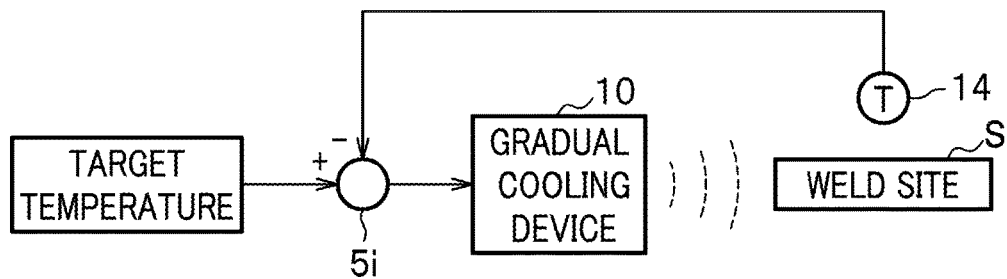
FIG. 17 is an arithmetic block diagram of the FSW apparatus according to the eighth embodiment.

FIG. 17 is an arithmetic block diagram of the FSW apparatus according to the eighth embodiment.

As FIG. 17 shows, a target temperature is inputted to the heat amount calculator 5i, and the heat amount calculator 5i then controls the gradual cooling device 10 so that the target temperature inputted may be reached. Then, the temperature of the weld site S (the welding temperature) measured by the temperature measurement device 14 is inputted to the heat amount calculator 5i. The heat amount calculator 5i then compares the welding temperature with the target temperature, and controls the gradual cooling device 10 so that the amount of heat outputted from the gradual cooling device 10 may be such that the welding temperature has zero deviation from the target temperature. Feedback control is thus performed using the temperature measured by the temperature measurement device 14.

Figure 18:
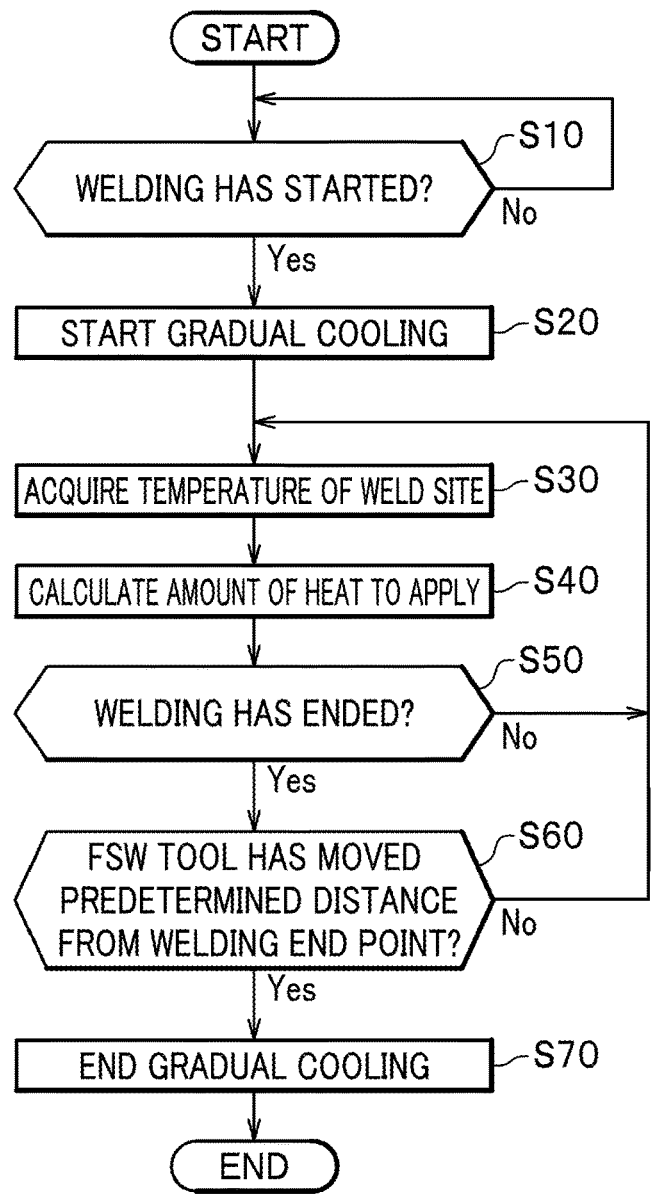
FIG. 18 is a flowchart illustrating the operation of the FSW apparatus according to the eighth embodiment.

FIG. 18 is a flowchart illustrating the operation of the FSW apparatus according to the eighth embodiment.

As FIG. 18 shows, in Step S10, the control device 5H determines whether the FSW apparatus 100H has started friction stir welding. It is determined that the FSW apparatus 100H has started friction stir welding when the welding tool 1 starts welding the to-be-welded members 101a and 101b along the welding line 102 after starting rotating until the temperature rises to a point where the welding tool 1 can perform welding.

In Step S10, when the control device 5H determines that the welding has not started (No), the processing of Step S10 is repeated, and when the control device 5H determines that the welding has started (Yes), the processing proceeds to Step S20.

In Step S20, the control device 5H starts gradual cooling (post-heating, post-heat application) by the gradual cooling device 10. Specifically, based on a target temperature, the control device 5H controls the amount of heat to be applied from the gradual cooling device 10 to the weld site S.

In Step S30, the control device 5H acquires a welding temperature T of the weld site S using the temperature measurement device 14.

In Step S40, the control device 5H calculates the amount of heat to be applied to the weld site S. The heat amount calculator 5i of the control device 5H compares the welding temperature T acquired in Step S30 with the target temperature determined, and controls the gradual cooling device 10 so that the welding temperature T may have zero deviation from (or may equal) the target temperature. Thereby, the weld site S is gradually cooled (heated). In other words, the weld site S is heated at a temperature which does not alter the metallographic structure that the weld site S has at the completion of welding.

In Step S50, the control device 5H determines whether the welding has finished. Whether the welding has finished is determined based on whether the FSW apparatus 100H has moved a preset distance. In Step S50, if the control device 5H determines that the welding has not finished (No), the processing is returned to Step S30, and if the control device 5H determines that the welding has finished (Yes), the processing proceeds to Step S60.

In Step S60, the control device 5H determines whether the FSW tool 1A has moved a predetermined distance α from the welding end point. Whether the FSW tool 1A has moved the predetermined distance α can be determined based for example on elapsed time calculated from the movement speed. In Step S60, if the control device 5H determines that the FSW tool 1A has not moved the predetermined distance α from the welding end point (No), the processing returns to Step S30, and if the control device 5H determines that the FSW tool 1A has moved the predetermined distance α (Yes), the processing proceeds to Step S70.

In Step S70, the control device 5H stops the power supply to the gradual cooling device 10 to end the gradual cooling.

As thus described, the eighth embodiment includes the control device 5H connected to the FSW apparatus 100H which includes: the FSW tool 1A that welds a plurality of to-be-welded members 101a and 101b to each other by friction stir; the gradual cooling device 10 that gradually cools the weld site S of the to-be-welded members 101a and 101b welded by the FSW tool 1A; and the temperature measurement device 14 that measures the welding temperature T of the weld site S. The control device 5H includes the target temperature storage 5h that stores target temperatures to be set for the weld site S, and the heat amount calculator 5i that calculates the amount of heat to be applied to the weld site S based on the target temperature. The heat amount calculator 5i controls the gradual cooling device 10 so that the welding temperature T may have zero deviation from the target temperature. When the welding temperature T of the weld site S is thus detected by the temperature measurement device 14, temperature management of the weld site S can be carried out with high accuracy, which may prevent metallographic alteration of the weld site S. As a result, friction stir welding with high accuracy can be achieved.

Ninth Embodiment

Figure 19:
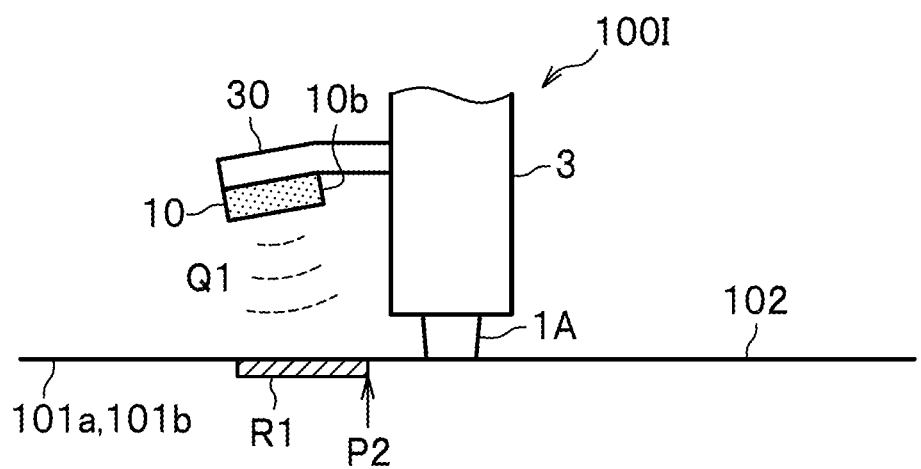
FIG. 19 is a diagram showing a schematic configuration of an FSW apparatus according to a ninth embodiment.

FIG. 19 is a schematic diagram of an FSW apparatus according to a ninth embodiment.

As FIG. 19 shows, an FSW apparatus 100I of the ninth embodiment is such that the gradual cooling device 10 is tilted toward the FSW tool 1A with respect to the vertical direction. The gradual cooling device 10 is configured with, for example, a high-frequency heat source or an optical heat source using laser light.

Such a configuration allows a gradual cooling start position (heating start position) P2 of the weld site S to be closer to the FSW tool 1A than the first embodiment, and thus can shorten the time lag between the end of welding by the FSW tool 1A and the start of gradual cooling. This consequently can help prevent the weld site S from undergoing metallographic alteration, and achieve high-quality friction stir welding.

The present invention is not limited to the embodiments described above, and further contains various modifications. For example, the above embodiments have been described in detail to merely facilitate the understanding of the present invention, and the present invention does not necessarily have to include all the configurations described herein. Further, part of a configuration in a certain embodiment may be replaced by a configuration in another embodiment, or a configuration in a certain embodiment may be added to a configuration in another embodiment. Also, regarding part of a configuration in each embodiment, a configuration included in another embodiment may be added, deleted, or replaced.

For example, the gradual cooling device 10 is attached to the housing 3 via the fixation member 30 in the examples described in the above embodiments, but the gradual cooling device 10 may be fixed directly to the housing 3.

In addition, the FSW apparatuses 100A to 100I are moved with the to-be-welded members 101a and 101b being stationary in the examples described in the above embodiments, but instead, the to-be-welded members 101a and 101b may be moved with the FSW apparatuses 100A to 100I being stationary.

What is claimed is:

1. A friction stir welding apparatus comprising:
   a friction stir welding tool that is held by an apparatus main body and welds a plurality of members to each other by friction stir;
   a gradual cooling device that gradually cools a weld site of the members welded by the friction stir welding tool; and
   a gradual cooling device axial movement driving device which moves the gradual cooling device vertically relative to the friction stir welding tool, wherein
   the apparatus main body includes a gradual cooling device welding direction movement driver that moves the gradual cooling device in a welding direction, and
   the gradual cooling device welding direction movement driver moves the gradual cooling device to change a distance from the gradual cooling device to the friction stir welding tool.

2. A friction stir welding apparatus comprising:
   a friction stir welding tool that is held by an apparatus main body and welds a plurality of members to each other by friction stir;
   a gradual cooling device that gradually cools a weld site of the members welded by the friction stir welding tool;
   a first driver that moves the friction stir welding tool in a welding direction;
   a second driver that moves the gradual cooling device in the welding direction; and
   a gradual cooling device axial movement driving device which moves the gradual cooling device vertically relative to the friction stir welding tool, wherein
   the second driver moves the gradual cooling device in the welding direction to change a distance from the gradual cooling device to the friction stir welding tool.

3. The friction stir welding apparatus according to claim 1, wherein
   the gradual cooling device is a contactless heat source that heats the weld site without coming into contact with the weld site.

4. The friction stir welding apparatus according to claim 3, wherein
   the contactless heat source is a high-frequency heat source.

5. The friction stir welding apparatus according to claim 3, wherein
   the contactless heat source is an optical heat source.

6. The friction stir welding apparatus according to claim 1, comprising:
   a tool movement driver that moves the friction stir welding tool along a welding line; and
   a heat amount controller that controls an amount of heat to be applied to the weld site by the gradual cooling device, wherein
   the heat amount controller increases the amount of heat to be applied to the weld site when the friction stir welding tool is moved away from the weld site at end of welding.

7. The friction stir welding apparatus according to claim 1, comprising:
   a tool movement driver that moves the friction stir welding tool along a welding line;
   and
   a gradual cooler driving controller that controls the gradual cooling device axial movement driving device, wherein
   the gradual cooling device axial movement driving device moves the gradual cooling device toward and away from the weld site, and
   the gradual cooler driving controller controls the gradual cooling device axial direction movement driver to drive the gradual cooling device toward the weld site when the friction stir welding tool is moved away from the weld site at end of welding.

8. The friction stir welding apparatus according to claim 1, wherein
   the apparatus main body includes a plurality of the gradual cooling devices arranged in the welding direction.

9. The friction stir welding apparatus according to claim 1, wherein
   the gradual cooling device is provided at an opposite side of the members from the friction stir welding tool.

10. The friction stir welding apparatus according to claim 1, wherein
    the gradual cooling device is disposed with a tilt toward the friction stir welding tool.

11. The friction stir welding apparatus according to claim 1, comprising a contactless temperature measurement device that detects temperature of the weld site.

12. A friction stir welding control device connected to a friction stir welding apparatus which includes a friction stir welding tool that is held by an apparatus main body and welds a plurality of members to each other by friction stir, a gradual cooling device that gradually cools a weld site of the members welded by the friction stir welding tool, a gradual cooling device welding direction movement driver that is provided to the apparatus main body and moves the gradual cooling device in a welding direction, and a temperature measurement device that measures a welding temperature of the weld site, the friction stir welding control device comprising:
    a target temperature storage that stores a target temperature to be set for the weld site; and
    a heat amount calculator that calculates an amount of heat to be applied to the weld site based on the target temperature, wherein
    the gradual cooling device is controlled to move vertically relative to the friction stir welding tool, the heat amount calculator controls the gradual cooling device so that the welding temperature has zero deviation from the target temperature, and the gradual cooling device welding direction movement driver is controlled to move the gradual cooling device to change a distance from the gradual cooling device to the friction stir welding tool.

* * * * *